March 27, 1928.
F. BUNEVAC
1,663,827
FOLDING SEAT CONSTRUCTION FOR AUTOMOBILE BODIES
Filed Jan. 4 1927    2 Sheets-Sheet 1
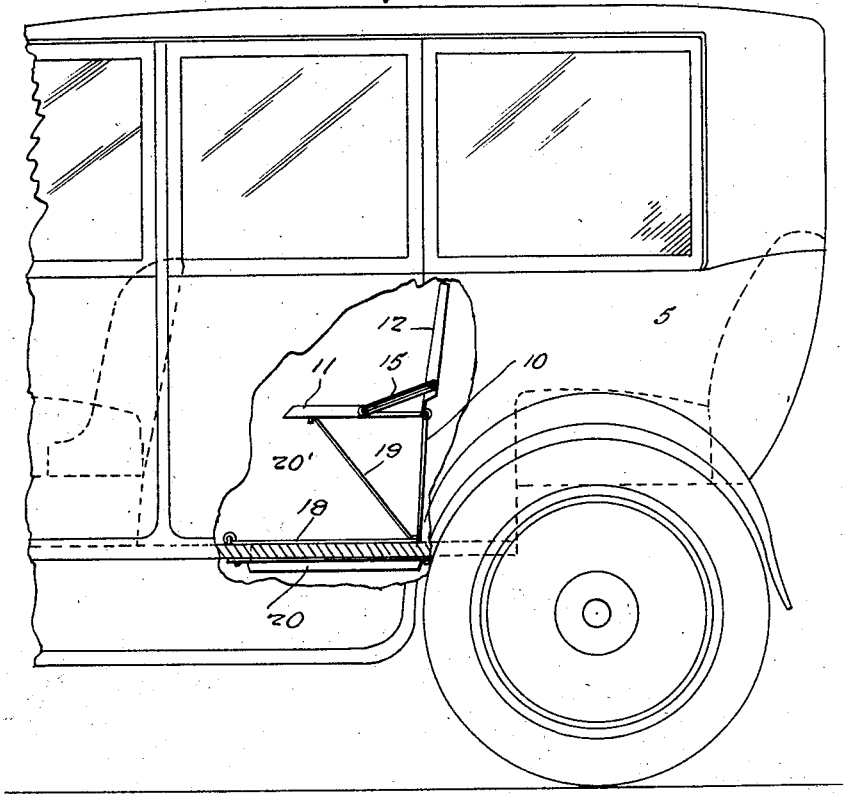
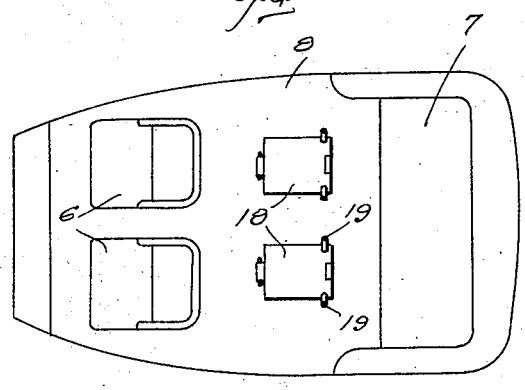
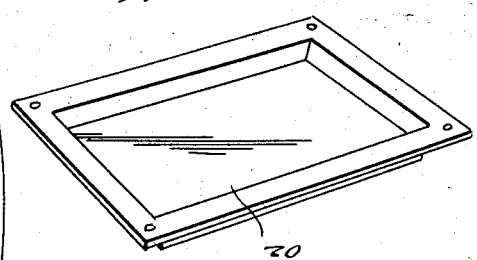
Inventor
Frank Bunevac
By Clarence A. O'Brien
Attorney

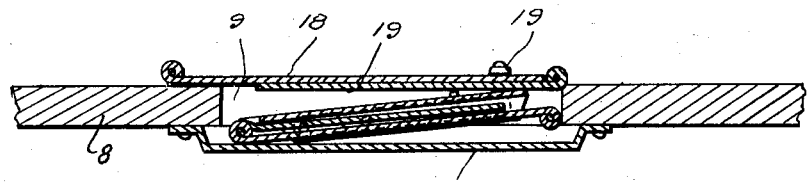
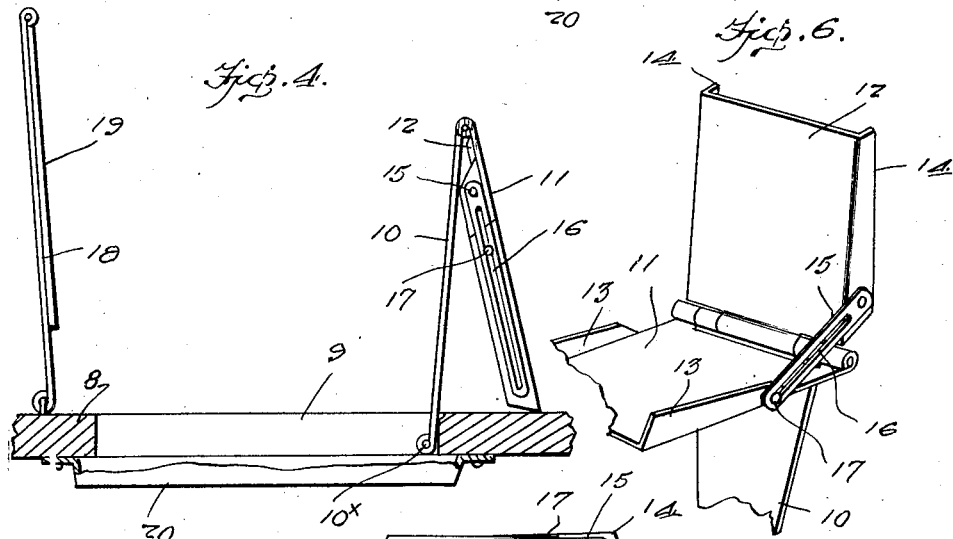
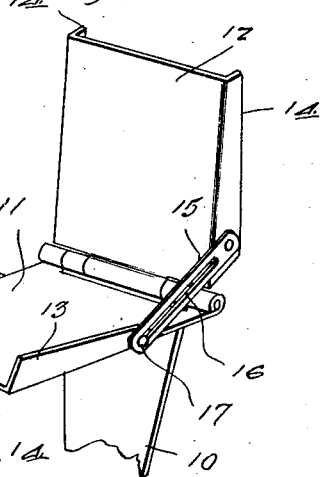
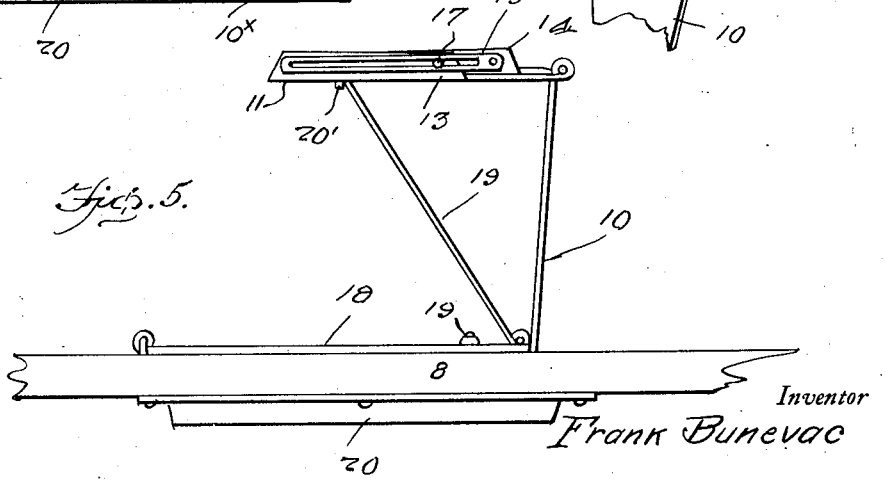

Patented Mar. 27, 1928.

1,663,827

UNITED STATES PATENT OFFICE.

FRANK BUNEVAC, OF ST. LOUIS, MISSOURI.

FOLDING-SEAT CONSTRUCTION FOR AUTOMOBILE BODIES.

Application filed January 4, 1927. Serial No. 158,896.

This invention relates to new and useful improvements in folding seats for automobiles, and has for its primary object to provide an auxiliary seat for arrangement between the front and rear seating structures of an automobile body that may be readily folded up and stored within a pocket formed in the body floor board so that the same will be entirely out of the way when not in use.

In carrying out my invention I prefer to arrange two of the present seat constructions in side by side relation between the front and rear seats of an automobile so that the ordinary five passenger car may be readily converted into a seven passenger car.

A still further and important object is to provide a folding seat construction of this character that is extremely simple and rigid in construction, and one that may be readily raised and extended for use, or that may be readily folded up and disposed within the pocket provided therefor.

A further and important object is to provide a seat construction of this character wherein there is provided a lid for the pocket for entirely closing the seat per se when the same is stored within the pocket, said lid being further adapted for providing a foot rest for the occupant of the seat in set up condition.

With the foregoing and other objects in view as the nature of the invention will be better understood, the same comprises the novel form, the combination and arrangement of parts hereinafter more fully described, shown in the accompanying drawings and claimed.

In the drawings wherein like numerals of reference indicate like parts:

Figure 1 is a fragmentary side elevation partly broken away and in section of a conventional closed automobile body equipped with my improved seat construction.

Figure 2 is a top plan view of a conventional automobile body, the crown being removed, disclosing a pair of my novel seat units as arranged between the front and rear seats of this type of automobile.

Figure 3 is an enlarged longitudinal section taken through a portion of the floor board of the automobile body disclosing one of the seats in entirely collapsed condition.

Figure 4 is a similar view disclosing the seat construction in edge elevation and partly in set up position.

Figure 5 is a side elevation of the floor board and the seat in still further set up condition.

Figure 6 is a fragmentary perspective of the seat per se, and

Figure 7 is a perspective of a pan shaped trough that is arranged in position beneath an opening in the floor board for supporting the seat when folded and arranged within the floor board opening.

Now having particular reference to the drawings, 5 designates generally the body of a conventional automobile, including front and rear seating arrangements 6 and 7, respectively, while 8 designates that portion of the body floor board between said seating arrangements.

In carrying out my invention the floor board at a point between the front and rear seats 6 and 7 is formed with a pair of transversely spaced substantially square-shaped openings, the one disclosed in Figures 3 and 4 being designated by the reference character 9. The pair of seats disclosed as arranged between the front and rear seats of the automobile body are of identical construction, and therefore a description of one will suffice for both. Said seat consists of a relatively wide supporting standard 10 hingedly secured at its inner end as at $10^x$ within the opening 9 of the floor board at the rear end thereof and adjacent its lower edge as clearly indicated in both Figures 3 and 4. Hingedly mounted upon the upper end of this standard 9 so as to swing in opposite directions thereon is a seat board 11, and a back rest 12 that may be of sheet metal, wood, or other suitable material. The opposite edges of the seat 11 are formed with upstanding tapered flanges 13—13 while the opposite edges of the back rest 12 are formed with rearwardly extending flanges 14—14. Pivotally secured to one or both of the flanges 14 of the back rest 12 adjacent to the lower ends thereof is a brace arm 15 formed throughout substantially its entire length with a longitudinal slot 16 through which projects a headed pin 17 adjacent to the inner end of one or both of the seat flanges 13.

Pivotally secured to the upper side of the floor board 8 at a point slightly beyond the forward end of the opening 9 therein is a square shaped lid 18 for the respective opening 9, when the seat construction per se is swung downwardly within the opening as in Figures 2 and 3. When the lid 18 is closed, the same may be secured in such position by suitable fasteners as turnbuckles 19, the particular construction of which is immaterial to the present invention, and therefore a detailed illustration and description is not believed necessary. Hingedly secured to the forward edge of this lid 18 at the center thereof a brace bar 19 that is adapted to be swung upwardly and rearwardly with respect to the lid 18 after the seat construction per se has been raised from the opening 9 and the lid 18 subsequently closed as in Figures 1 and 5. The free end of this brace arm is adapted for disposition in back of a stop lug 20' formed or otherwise suitably arranged upon the under side of the seat 11 adjacent the forward edge thereof.

Secured to the under side of the floor board 8 beneath the opening 9 is a pan shaped closure 20 for the purpose of preventing air, dust, dirt, and the like from passing upwardly through the opening and also for the purpose of supporting the seating unit per se when the same is lowered into the opening of the floor board.

Assuming the seat to be in set up condition as in Figures 1 and 6, the back rest 12 is swung rearwardly over the vertical support 10 after which the seat 11 is swung into position thereover Figure 4, and after which the seat, back rest, and support may be lowered as a unit into opening 9 of the floor board as in Figure 3. Prior to the positioning of the seat unit in the opening 9, the lid 18 is raised therefrom after which the arm 19 is swung over upon the inner side of the lid after which the lid may be dropped to closed position and locked for closing the opening and for protecting the seat unit against being walked upon by persons entering or leaving the car.

In view of the foregoing specification when considered in conjunction with the accompanying drawing it will at once be apparent that I have provided a highly novel, simple, and efficient seat construction for automobile bodies that is well adapted for all the purposes heretofore designated and even though I have herein shown and described the invention as consisting of certain detail structural elements, it is nevertheless to be understood that some changes may be made therein without affecting the spirit and scope of the appended claim.

Having thus described the invention, what I claim is:

In a seating arrangement for an automobile wherein the floor board thereof is provided with an opening, a folding seat unit including a seat board, a back rest, and a supporting standard, said standard being hingedly secured at its lower end within the opening and said seat board and back rest being hinged to the upper end of the standard, a lid for closing the opening when the seat is disposed therein or raised therefrom, said lid hinged to the floor board adjacent the end of the opening remote from the hinged point of the standard; and a brace bar associated with the lid for engagement beneath the seat for supporting the same in rigidly set up condition, said brace bar hinged to the free end of the lid and adapted in one position to rest under the seat board for the support of the board and in another position to be folded under the lid and be received in said opening.

In testimony whereof I affix my signature.

FRANK BUNEVAC.